United States Patent
Massena

Patent Number: 5,429,331
Date of Patent: Jul. 4, 1995

[54] GLUE GUN HOLDER

[76] Inventor: Len Massena, 9423 Tarleton, Dallas, Tex. 75218

[21] Appl. No.: 166,201

[22] Filed: Dec. 10, 1993

[51] Int. Cl.⁶ .......................................... F16M 11/00
[52] U.S. Cl. .................................. 248/176; 219/242
[58] Field of Search ............ 248/176, 121, 676, 117.2; 219/242, 214; 211/60.1

[56] References Cited

U.S. PATENT DOCUMENTS

| | | |
|---|---|---|
| D. 234,905 | 4/1975 | Foster et al. . |
| D. 255,771 | 7/1980 | Cruz . |
| D. 262,862 | 2/1982 | Lytle . |
| D. 303,611 | 9/1989 | Spirk, Jr. et al. . |
| D. 307,105 | 4/1990 | Nusse et al. . |
| D. 308,932 | 7/1990 | Straub . |
| D. 315,283 | 3/1991 | De Carolis et al. . |
| 1,988,190 | 1/1935 | Dodge ........................ 312/330.1 X |
| 3,924,097 | 12/1975 | Knowles .................... 248/117.2 X |
| 3,990,623 | 11/1976 | Fortune ....................... 248/176 X |
| 4,293,760 | 10/1981 | Smal ............................ 219/242 |
| 4,333,623 | 6/1982 | May . |
| 4,671,476 | 6/1987 | Yim ............................ 248/117.2 |
| 4,692,587 | 9/1987 | Spirk, Jr. et al. . |
| 4,730,799 | 3/1988 | Foss et al. . |
| 4,826,049 | 5/1989 | Speer . |
| 4,998,698 | 3/1991 | Martinson . |
| 4,999,480 | 3/1991 | Smith ........................... 219/242 X |
| 5,127,616 | 7/1992 | Carney ........................ 248/176 |

Primary Examiner—J. Franklin Foss

[57] ABSTRACT

The present glue gun provides a stable frame in which to rest a glue gun. The holder (10) is formed by a pair of opposed side walls (12, 14) attached to a base (16). A partition (18) connects the opposed side walls. A notch (30) formed on the upper surface of the partition can accept the barrel of the glue gun. A portion of the base extends beyond the partition to catch any drips from the glue gun tip. Pockets (20, 22) can be found in the side walls. An optional heat shield (44) can be removably attached to the base or side walls and protects the user from accidental burns.

14 Claims, 2 Drawing Sheets a
GLUE GUN HOLDER

TECHNICAL FIELD OF THE INVENTION

The present invention relates to a glue gun holder and specifically to a holder which balances a glue gun while providing various trays and pockets for supplies.

BACKGROUND OF THE INVENTION

Glue guns are used in the manufacture of textile products. The gun accepts a solid glue inserts and melts one end of the insert. The melted glue can be controllably discharged from one end of the glue gun through a tip. The glue gun also has a handle to facilitate its handling by an operator. Between uses, the operator may place the glue gun onto a work table. Unfortunately, liquified glue may drip from the tip and mess the work table.

Several attempts have been made to create appropriate stands to hold the glue gun in a substantially upright position. For example, U.S. Pat. No. 4,998,698 to Martinson discloses a glue gun holder wherein the glue gun barrel rests on a support. The glue gun holder also has a ceramic plate for catching any glue drippings. A glue stick magazine is attached to the base. U.S. Pat. No. 4,333,623 to May discloses another glue gun holder made of two plates attached to a base. The body of the gun rests in a cutout in the upper portion of a V-shaped plate.

Even if the glue gun is placed in an upright position, the operator must also be excessively careful not to touch the hot glue gun tip. Accidental contact with the tip can seriously burn the operator with melted glue. Therefore, a need exists for a glue gun holder which can hold the glue gun in an upright position as well as protect the operator from accidental burns. Such a glue gun holder should also have a tray to catch any hot glue drippings. The glue gun holder should also be dimensioned to accept glue guns of various sizes. Also, no prior art device appears to provide for storage of glue sticks or utensils. Therefore, a need exists for a glue gun holder having pockets for storage of such.

SUMMARY OF THE INVENTION

The present invention relates to a glue gun holder for use by a textile manufacturer. The glue gun is often set on a table between uses, allowing the glue to drip on the table. The present holder is configured to hold the gun barrel. The base portion under the glue gun tip can be covered with a glue resistant surface such as a ceramic. To prevent the glue gun holder from sliding along the work table, the base can be removably attached to the work table by velcro.

Side walls are provided with pockets to hold glue sticks. A base portion extends under the glue gun tip to catch any glue drippings. The tip portion rests on a front wall. The front wall has a notched area for accepting glue guns of different sizes. A slidable tray fits into an insert area which allows for easy access storage of items that may be small or should not be left around for safety reasons, i.e. razor blades and knives. A removable heat shield protects the user from the hot tip when the glue gun is in the holder. The side walls, base, and front wall can be made of a heat impervious material.

BRIEF DESCRIPTION OF THE DRAWINGS

For a more complete understanding of the present invention, and for further details and advantages thereof, reference is now made to the-following Detailed Description taken in conjunction with the accompanying drawings, in which.

DETAILED DESCRIPTION OF THE DRAWINGS

Figure 1:
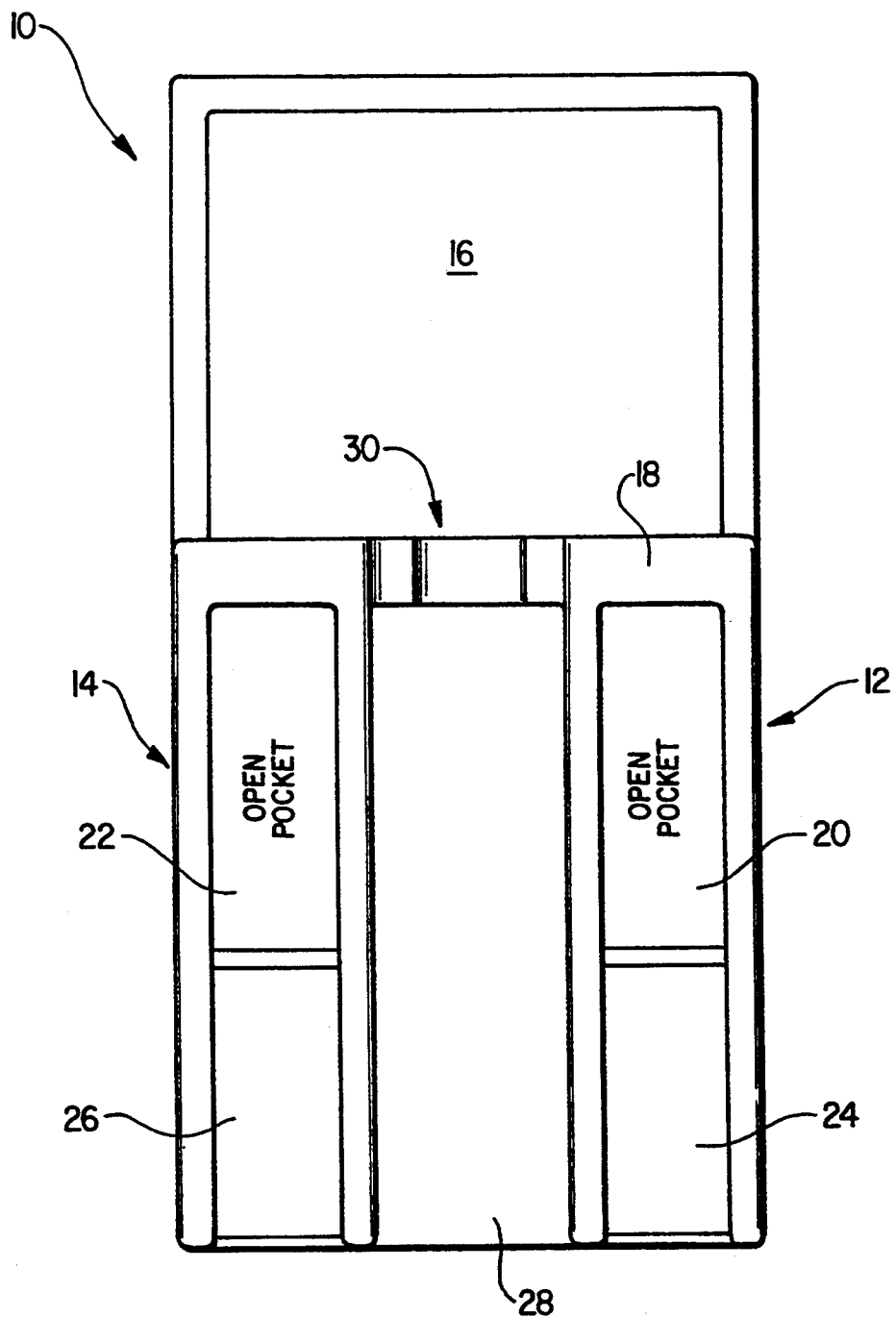
FIG. 1 is a top view of the glue gun holder.

The present invention relates to a glue gun which overcomes many of the disadvantages found in the prior art. Referring to FIG. 1, a glue gun holder 10 embodying the present invention is disclosed. The glue gun holder comprises a base 16 with a pair of opposed side walls 12, 14. A partition 18 connects side walls 12, 14. The base extends forward of said partition 18. The partition 18 has a notch 30 for receiving the barrel of a glue gun.

Each side wall 12, 14 can have a pocket 20, 22 for accepting glue sticks or other objects. The pockets can hold various tools of the trade such as pencils, paint brushes and scissors. Each side wall 12, 14 can also have a top surface 24, 26. The area 28 between said side walls 12, 14 is dimensioned to accept the handle of the glue gun. The area 28 should be large enough to allow the user to easily grasp the glue gun handle. The base 16 can be covered with a glue resistant surface, such as a ceramic. Thus, glue drippings can be wiped away with ease, even after hardening. In a preferred embodiment, the base is approximately 4½ inches in width and 9 inches in length. Side walls 12, 14 can be 1½ inch in width (including the pockets) 20, 22. The partition can be ½ inch in thickness.

Figure 2:
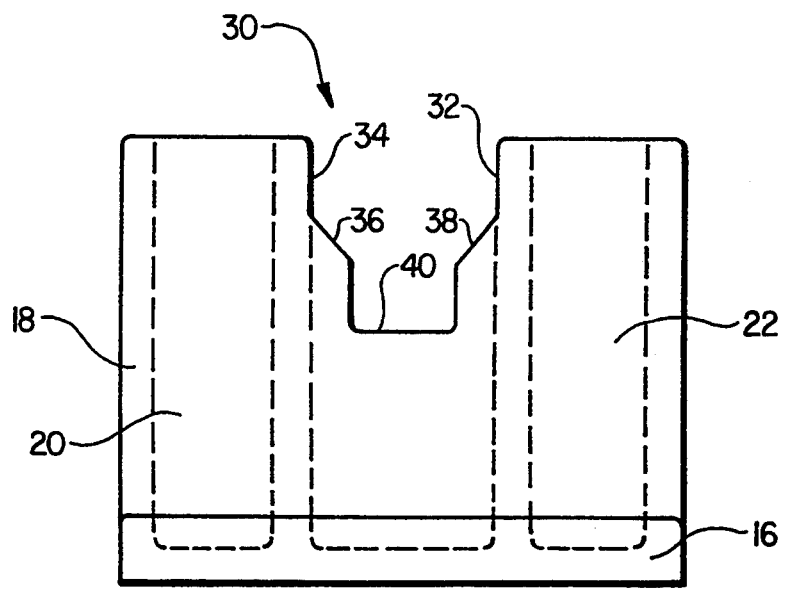
FIG. 2 is a front view of the glue gun holder.

FIG. 2 provides a front view of the glue gun holder 10. The notch 30 in partition 18 is shown with a pair of vertical surfaces 32, 34, and a pair of angled surfaces 36, 38 and a base 40. The glue gun barrel can rest in the notch 30. If the barrel is particularly large, it may rest on the angled surfaces 36, 38. If it is a smaller barrel, it can rest on surface 40. In other words, the present glue gun holder can hold different sizes of glue guns. Pockets 18 and 22 can be almost the entire depth of the side walls. In a preferred embodiment, the distance between surfaces 32, 34 is approximately 1½ inch, while the distance across base 40 is approximately ⅞ inch. The notch 30 is approximately 1½ inch in depth.

Figure 3:
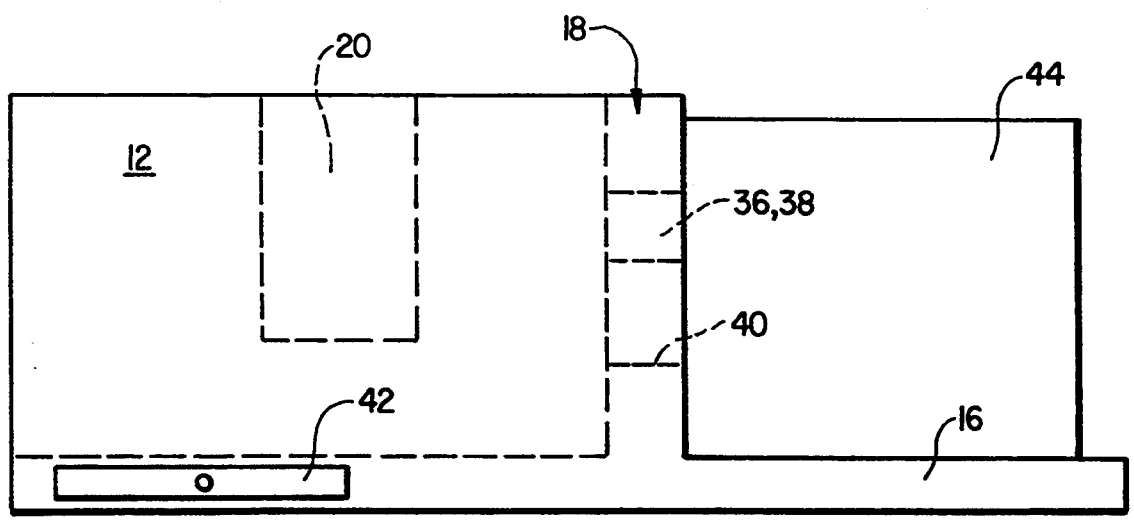
FIG. 3 is a side view of the glue gun holder equipped with a removable heat shield.

FIG. 3 provides a side view of an alterative embodiment of the glue gun holder 10. A tray 42 can slidingly engage the base 16. Such a tray 42 can be used to store razor blades or other useful devices for the user. A heat shield 44 is shown attached to the base forward of partition 18. The heat shield can be removable. For example, the heat shield could simply engage grooves in the base 16. Alternatively, the heat shield could be hingedly attached at 46, as shown, such that the heat shield can be moved at the convenience of the user. Either one or two side heat shields 44 could be used. Alternatively, an entire heat shield enclosure could block access to the entire area forward of the partition 18. The heat shield could be clear to allow viewing of the glue gun.

Of course, the dimensions provided only represent those of the preferred embodiment. The glue gun holder can be sized to suit any particular gun. Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. An apparatus for holding a glue gun having a body and a tip which comprises:
   (a) a base portion;
   (a) a housing attached to said base having a first and second side wall, and a front partition extending between said side walls; wherein said first and second side walls extend along the body of the glue gun, and wherein said base portion extends beyond the housing.

2. The glue gun holder of claim 1 further comprises:
   (c) a heat shield which is removably attached to the extended base portion of the housing.

3. The glue gun holder of claim 1 wherein either of the first and second side walls is formed having a plurality of pocket chambers wherein objects are placed.

4. The glue gun holder of claim 1 wherein the partition has a notched portion to engage the tip of a glue gun.

5. The glue gun holder of claim 1 wherein base portion presents an upper surface covered with a glue impervious material.

6. The glue gun holder of claim 5 wherein said glue impervious material is a ceramic.

7. The glue gun holder of claim 4 wherein the notched portion provides a first and second resting surface separated by a pair of opposed sloped walls.

8. The glue gun holder of claim 1 wherein the base portion has an opening for a slidable tray on a vertical side wall allowing a readily accessible storage area.

9. An apparatus for holding a glue gun having a body and a tip which comprises:
   (a) a base portion;
   (a) a housing attached to said base having a first and second side wall, and a front partition extending between said side walls, wherein said base portion extends beyond the housing and presents a glue impervious surface and wherein said first and second side walls extend along the body of the glue gun; and
   (c) a heat shield which is removably attached to the extended base portion of the housing.

10. The glue gun holder of claim 9 wherein either of the first and second side walls is formed having a plurality of pocket chambers wherein objects are placed.

11. The glue gun holder of claim 9 wherein the partition has a notched portion to engage the tip of a glue gun.

12. The glue gun holder of claim 9 wherein said glue impervious material is a ceramic.

13. The glue gun holder of claim 9 wherein the notched portion provides a first and second resting surface separated by a pair of opposed sloped walls.

14. The glue gun holder of claim 9 wherein the base portion has an opening for a slidable tray on a vertical side wail allowing a readily accessible storage area.

* * * * *